US012017467B2

(12) United States Patent
Murashima

(10) Patent No.: US 12,017,467 B2
(45) Date of Patent: Jun. 25, 2024

(54) COUPLING STRUCTURE AND IMAGE FORMING APPARATUS

(71) Applicant: KYOCERA Document Solutions Inc., Osaka (JP)

(72) Inventor: Masaki Murashima, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 128 days.

(21) Appl. No.: 17/696,725

(22) Filed: Mar. 16, 2022

(65) Prior Publication Data

US 2022/0314669 A1 Oct. 6, 2022

(30) Foreign Application Priority Data

Mar. 30, 2021 (JP) ................................ 2021-057090

(51) Int. Cl.
*B41J 2/165* (2006.01)
*B41J 29/17* (2006.01)

(52) U.S. Cl.
CPC .............. *B41J 29/17* (2013.01); *B41J 2/165* (2013.01); *B41J 2002/16594* (2013.01)

(58) Field of Classification Search
CPC .... B41J 2/165; B41J 2/17513; B41J 2/17523; B41J 2/17596; B41J 29/17; B41J 2002/16594; B05B 11/3025; B67F 7/0294; F17C 13/04
See application file for complete search history.

(56) References Cited

U.S. PATENT DOCUMENTS

2020/0122473 A1* 4/2020 Maeshima .......... B41J 2/17566

FOREIGN PATENT DOCUMENTS

JP 2016-083832 A 5/2016

* cited by examiner

*Primary Examiner* — Christopher E Mahoney
*Assistant Examiner* — Marissa Ferguson-Samreth
(74) *Attorney, Agent, or Firm* — Studebaker & Brackett PC

(57) ABSTRACT

The coupling structure includes a container side joint and a main body side joint. The container side joint includes a container opening/closing valve, a container side communication passage, a backflow prevention valve and a protrusion. The container opening/closing valve is brought into contact with the protrusion by a pressure of the liquid filled in the container side communication passage. The main body side joint includes a main body opening/closing valve and a main body side communication passage. When the main body opening/closing valve pushes the container opening/closing valve at a coupling of the container side joint and the main body side joint, the container opening/closing valve is pushed in a coupling direction, is also tilted and is separated from the protrusion to communicate the container side communication passage with the main body side communication passage.

7 Claims, 8 Drawing Sheets

COUPLING STRUCTURE AND IMAGE FORMING APPARATUS

INCORPORATION BY REFERENCE

This application is based on and claims the benefit of priority from Japanese patent application No. 2021-057090 filed on Mar. 30, 2021, which is incorporated by reference in its entirety.

BACKGROUND

The present disclosure relates to a coupling structure coupling a cleaning liquid tank to a cleaning unit and an image forming apparatus including the coupling structure.

A container in which a liquid, such as a cleaning liquid, is contained and a body to be supplied with the liquid, such as a cleaning unit, are coupled to each other by a coupling structure. For example, an ink container (an example of the container) and a container attachment part (an example of the body to be supplied with the liquid) are coupled to each other by a coupling structure.

In the coupling structure, a container side opening/closing valve which opens or closes a supply port of the ink container is moved along a coupling direction to the container attachment part so as to open or close the supply port.

In the above-described coupling structure, the container side opening/closing valve is biased toward the supply port by a spring. Alternatively, the container side opening/closing valve may be biased toward the supply port by a pressure of the liquid filled in a space between the container side opening/closing valve and a backflow prevention valve. In such a case, in order to open the supply port, it is necessary to push the container side opening/closing valve in a direction opposite to the supply port against the biasing force of the spring and the pressure of the liquid filled in the space. Especially, in a case where the liquid is filled in the space between the container side opening/closing valve and the backflow prevention valve, because the liquid is non-compressed, a large force is necessary to open the supply port, and there is a problem that a workability at a time of coupling work is deteriorated.

SUMMARY

In accordance with an aspect of the present disclosure, a coupling structure couples a container in which a liquid is contained and a body to be supplied with the liquid from the container. The coupling structure includes a container side joint attached to a supply port of the container; and a main body side joint attached to an inflow port of the body. The container side joint includes a container opening/closing valve, a container side communication passage, a backflow prevention valve and a protrusion. The container opening/closing valve can open and close the supply port. The container side communication passage is communicated with the supply port and an inside of the container. The backflow prevention valve prevents a backflow of the liquid from the container side communication passage to the inside of the container. The container opening/closing valve is brought into contact with the protrusion by a pressure of the liquid filled in the container side communication passage between the container opening/closing valve and the backflow prevention valve. The main body side joint includes a main body opening/closing valve and a main body side communication passage. The main body opening/closing valve can open and close the inflow port. The main body side communication passage is communicated with the inflow port. When the main body opening/closing valve pushes the container opening/closing valve at a coupling of the container side joint and the main body side joint, the container opening/closing valve is pushed in a coupling direction, is also tilted and is separated from the protrusion to communicate the container side communication passage with the main body side communication passage.

In accordance with an aspect of the present disclosure, an image forming apparatus includes a cleaning liquid tank and a cleaning unit which are coupled to each other using the coupling structure.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an image forming apparatus and a coupling structure according to one embodiment of the present disclosure will be described with reference to the drawings.

Figure 1:
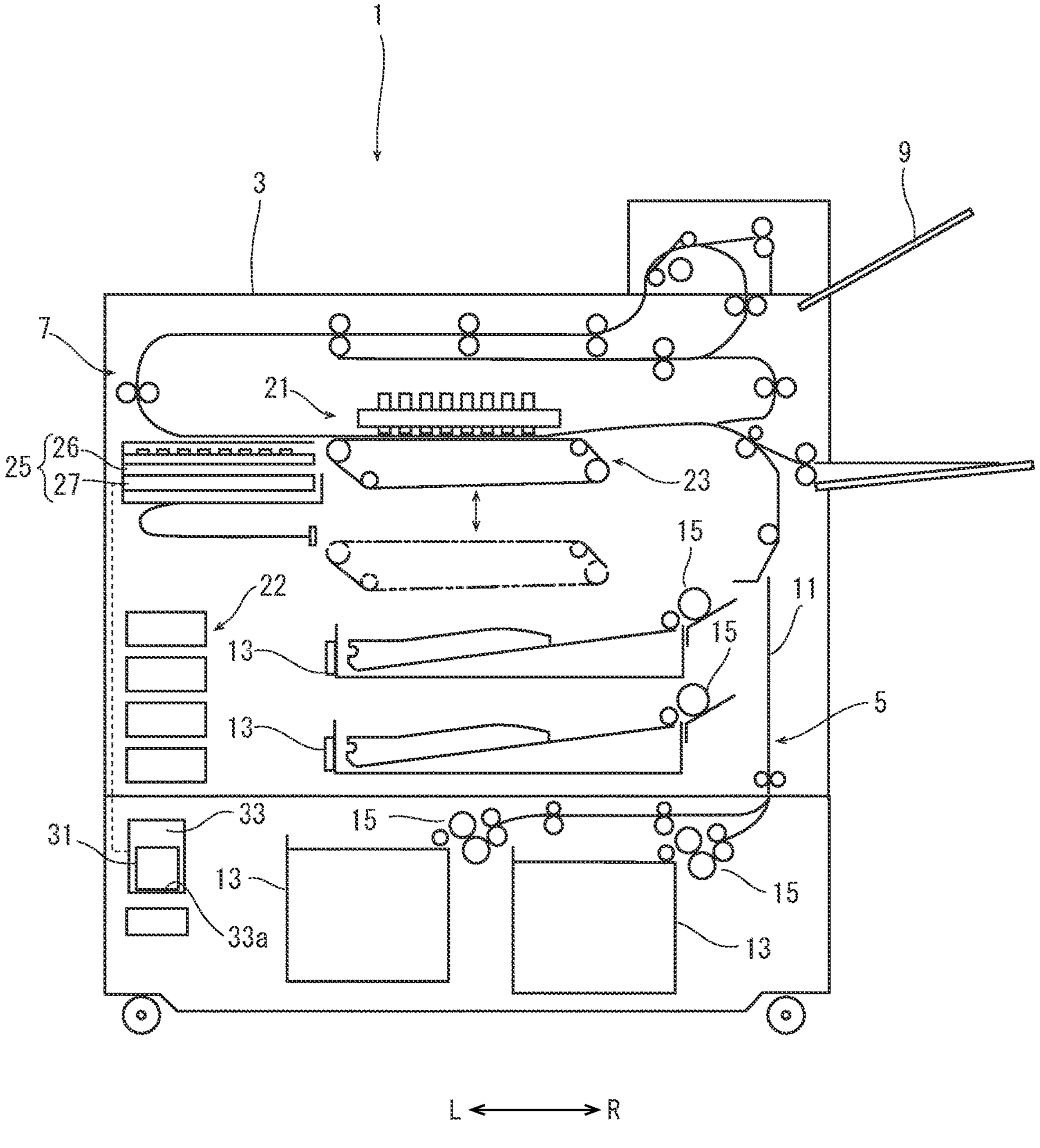
FIG. 1 is a front view schematically showing an inner structure of an image forming apparatus according to one embodiment of the present disclosure.

First, with reference to FIG. 1, an image forming apparatus 1 will be described. FIG. 1 is a front view schematically showing an inner structure of the image forming apparatus 1. In the following description, a near side (a front side) of a paper surface of FIG. 1 is defined to be a front side of the image forming apparatus 1. In each figure, L and R respectively show a left side and a right side of the image forming apparatus 1.

An apparatus main body 3 of the image forming apparatus 1 includes a sheet feeding part 5, an inkjet type image forming part 7 and a discharge tray 9. Further, in the apparatus main body 3, a conveyance path 11 along which a sheet is conveyed is formed from the sheet feeding part 5 to the discharge tray 9 through the image forming part 7.

The sheet feeding part 5 is disposed in the lower portion in the apparatus main body 3, and includes a plurality of sheet feeding cassettes 13 which store a sheet and a plurality of sheet feeding devices 15 which feed the sheet from the respective sheet feeding cassettes.

The image forming part 7 is disposed in the upper portion in the apparatus main body 3, and includes a head unit 21 which forms an image on the sheet, a conveyance unit 23 which conveys the sheet, and a maintenance unit 25 which maintains the head unit 21.

The head unit 21 includes four recording heads corresponding to ink of four colors (black, cyan, magenta and yellow). Each recording head is connected to an ink tank 22 in which the ink of the corresponding color is contained.

The conveyance unit 23 includes an endless belt traveling in the predetermined direction to convey the sheet. The conveyance unit 23 is supported so as to be lifted and lowered between a printing position (see the solid line in FIG. 1) where a sheet conveyance surface of the conveyance belt is disposed below the head unit 21 and a retreat position (see the two-dotted chain line in FIG. 1) where the sheet conveyance surface of the conveyance belt is separated from the head unit 21 farther than the printing position.

The maintenance unit 25 includes a capping unit 26 configured to cover the recording heads of the head unit 21 with caps, and a cleaning unit 27 configured to clean the recording heads using wipers. The maintenance unit 25 is movable between a cleaning position below the head unit 21 and a retreat position separated leftward from the head unit 21. To the cleaning unit 27, a cleaning liquid tank 31 in which a cleaning liquid for cleaning the recording head is contained is connected. The cleaning liquid tank 31 is installed in a storage part 33 provided in the lower portion in the apparatus main body 3, for example. The cleaning liquid is an example of a liquid in the present disclosure, and the cleaning liquid tank 31 is an example of a container in the present disclosure. The cleaning unit 27 is an example of a body to be supplied with a liquid, in the present disclosure. The cleaning liquid tank 31 will be described later.

At a time of an image forming operation, the conveyance unit 23 is lifted from the retreat position to the printing position. The sheet fed from the corresponding sheet feeding cassette 13 by the corresponding sheet feeding device 15 in the sheet feeding part 5 is conveyed to the image forming part 7 along the conveyance path 11. In the image forming part 7, when the sheet passes under the head unit 21, the ink is ejected from the recording heads of the head unit 21 to form an image on the sheet. The sheet on which the image is formed is conveyed along the conveyance path 11 and then discharged to the discharge tray 9.

When the recording heads of the head unit 21 are cleaned, the conveyance unit 23 is lifted from the printing position to the retreat position, and then the maintenance unit 25 is moved from the retreat position to the cleaning position. A description of the cleaning operation is omitted.

Figure 2:
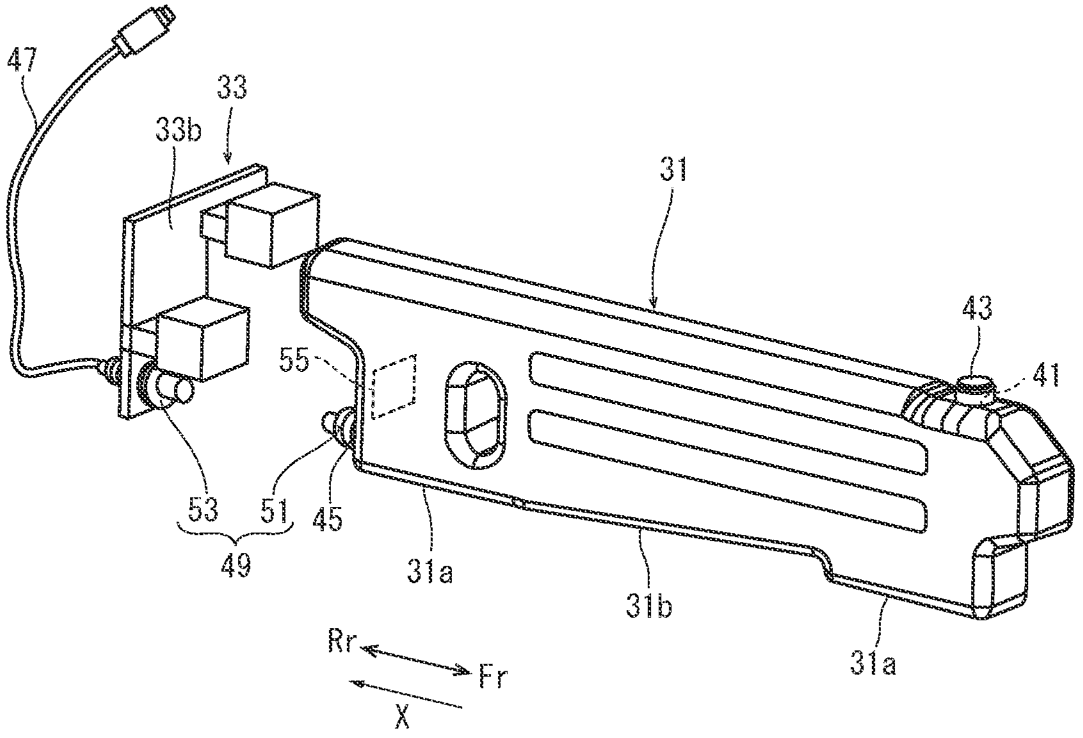
FIG. 2 is a perspective view showing a cleaning liquid tank, in the image forming apparatus according to the embodiment of the present disclosure.

Next, the cleaning liquid tank 31 will be described with reference to FIG. 2. FIG. 2 is a perspective view showing the cleaning liquid tank 31.

The cleaning liquid tank 31 has a hollow parallelepiped shape long in the horizontal direction. Both the longitudinal end portions 31*a* of the lower surface of the cleaning liquid tank 31 are formed to be flat, and the intermediate portion 31*b* between the end portions 31*a* is inclined downward from one longitudinal end portion toward the other longitudinal end portion (toward the rear side). The cleaning liquid tank 31 is installed in and removed from the storage part 33 of the apparatus main body 2 along an installing direction X along the longitudinal direction. In this example, the installing direction X is along the front-and-rear direction. When the cleaning liquid tank 31 is installed in the storage part 33 of the apparatus main body 2, both the longitudinal end portions 31*a* of the lower surface are placed on the bottom wall 33*a* (a ground surface) of the storage part 33 (see FIG. 1).

An inflow port 41 is formed on the upper surface of the end portion of the cleaning liquid tank 31 on the one longitudinal end side (the front side in the installing direction X). Through the inflow port 41, the cleaning liquid is injected into the cleaning liquid tank 31. The inflow port 41 is closed by a cap 43.

A cylindrical mouth 45 is formed on the lower end portion of the end wall of the cleaning liquid tank 31 on the other longitudinal end side (the rear side in the installing direction X). The cylindrical mouth 45 projects rearward from the end wall. Around the outer circumferential surface of the cylindrical mouth 45, a screw is formed.

On the other hand, on the inner wall 33*b* of the storage part 33, one end of a tube 47 is fixed. The tube 47 is connected to the cleaning unit 27 via a pump (not shown) provided in the apparatus main body 2. The cylindrical mouth 45 of the cleaning liquid tank 31 and the one end of the tube 47 can be coupled to each other by a coupling structure 49. The coupling structure 49 includes a container side joint 51 attached to the cylindrical mouth 45 and a main body side joint 53 attached to the one end of the tube 47. The cylindrical mouth 45 is an example of a supply port of a container, in the present disclosure. The end of the tube 47 is an example of an inflow port of a body to be supplied with a liquid, in the present disclosure. When the cleaning liquid tank 31 is installed in the storage part 33, the container side joint 51 is coupled to the main body side joint 53, so that the cylindrical mouth 45 and the tube 47 are communicated with each other. The coupling structure 49 will be described later.

An electrostatic capacitance sensor 55 is mounted on the end wall of the cleaning liquid tank 31 on the other longitudinal end side (on the rear side in the attachment direction X) above the cylindrical mouth 45. The electrostatic capacitance sensor 55 is mounted such that the lowermost height of the detection surface (within the height range of the electrostatic capacitance sensor 55) is slightly higher than the height of the liquid level when the cleaning liquid is contained to the lowermost height at which the cylindrical mouth 45 is blocked. The electrostatic capacitance sensor 55 detects a change in capacitance due to the amount of cleaning liquid contained between the detection surface and the ground surface (the bottom wall 33*a* of the storage part 33, see FIG. 1), and detects whether the cleaning liquid tank 31 is empty.

Figure 3:
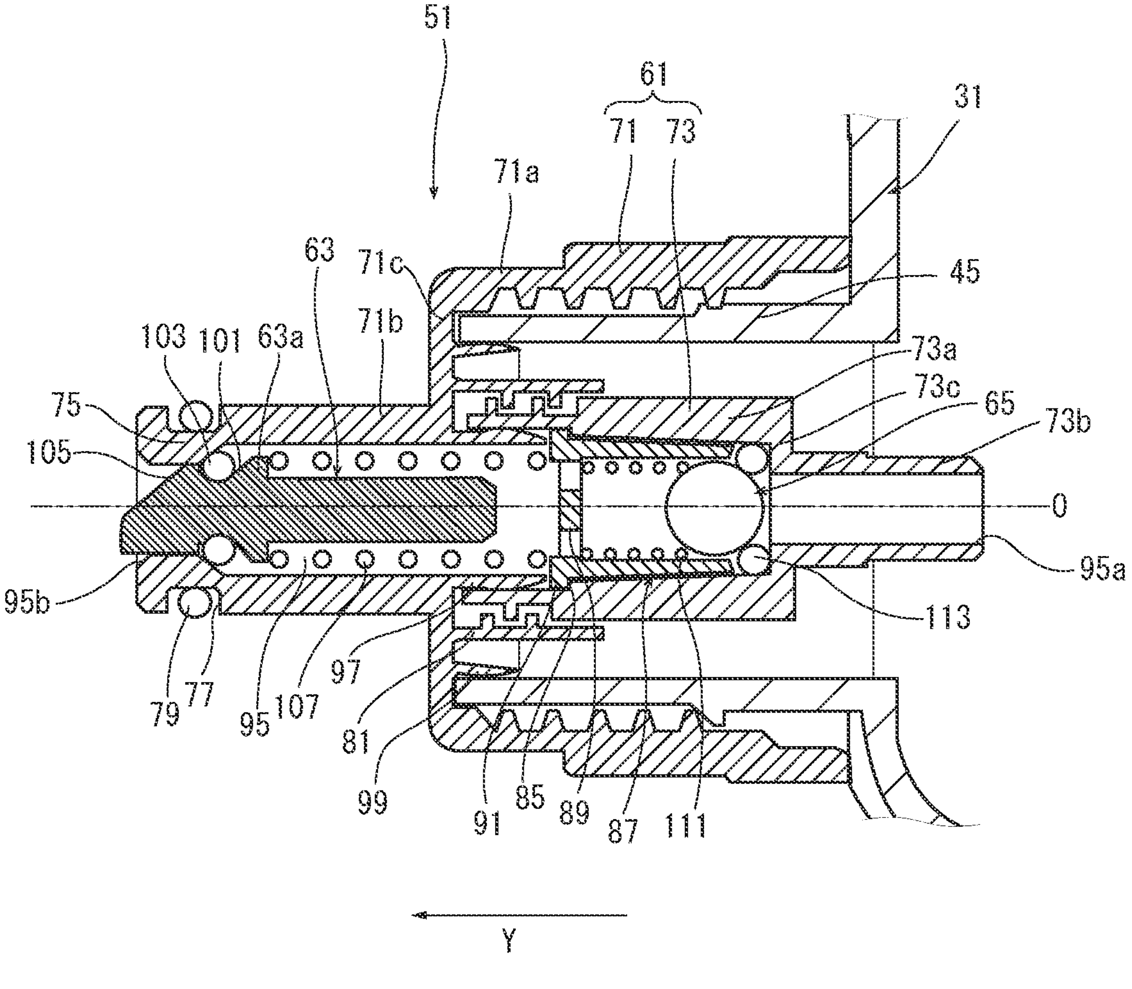
FIG. 3 is a sectional view showing a container side joint of a coupling structure according to the embodiment of the present disclosure.
Figure 4:
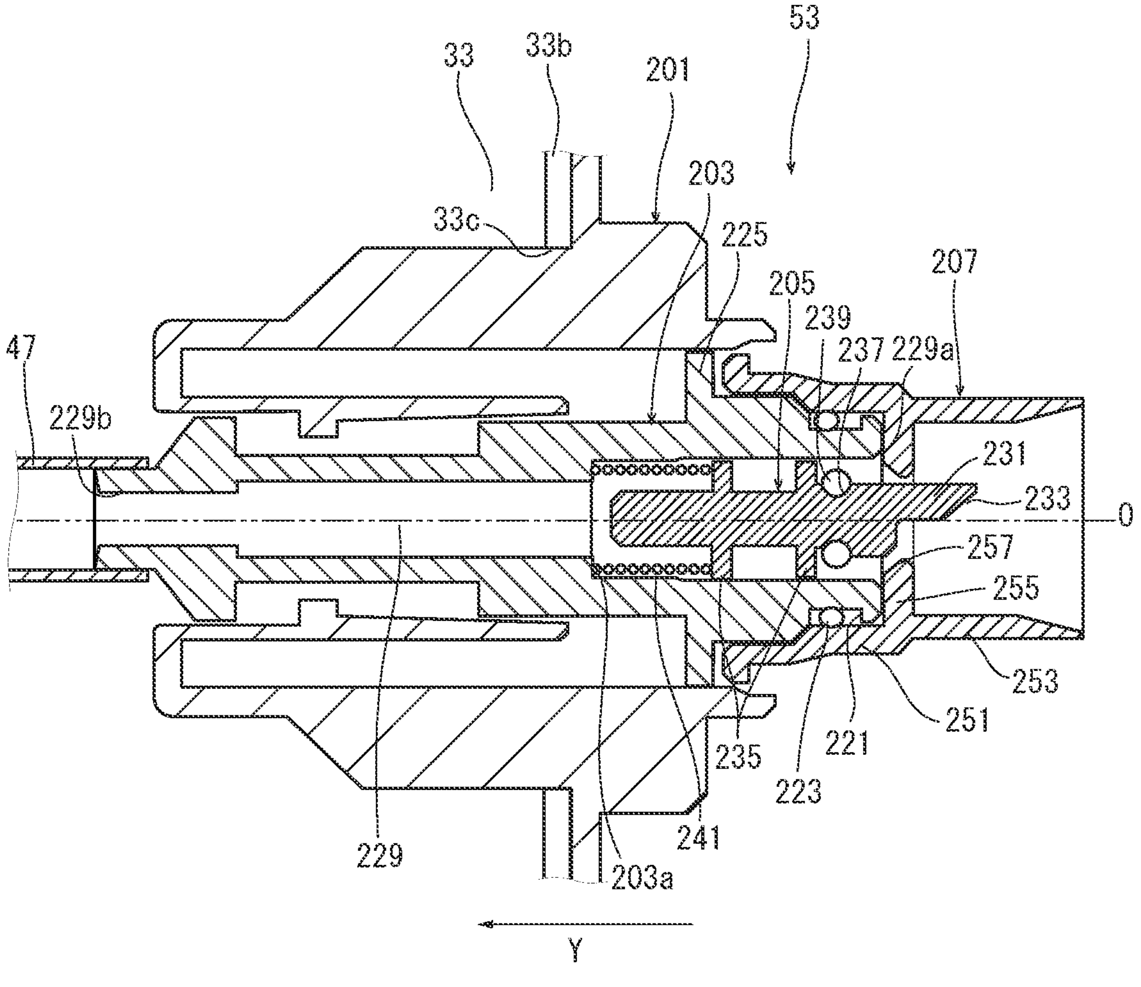
FIG. 4 is a sectional view showing a main body side joint of the coupling structure according to the embodiment of the present disclosure.
Figure 5:
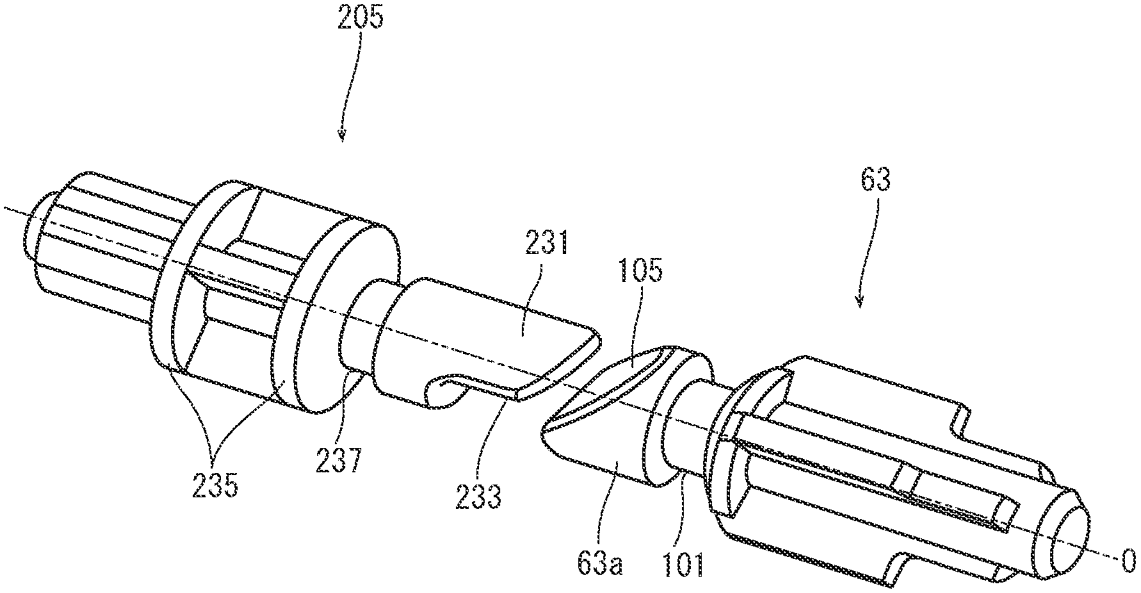
FIG. 5 is a perspective view showing a container opening valve and a main body opening valve of the coupling structure according to the embodiment of the present disclosure.

Next, with reference to FIG. 3 to FIG. 5, the coupling structure 49 between the cylindrical mouth 45 of the cleaning liquid tank 31 and the one end of the tube 47 will be described. FIG. 3 is a sectional view showing the container side joint 51 of the coupling structure 49, FIG. 4 is a sectional view showing the main body side joint 53 of the coupling structure 49, and FIG. 5 is a perspective view showing a container opening/closing valve 63 and a main body opening/closing valve 205. As described above, the coupling structure 49 includes the container side joint 51 attached to the cylindrical mouth 45 and the main body side joint 53 attached to the one end of the tube 47. When the cleaning liquid tank 31 is installed in the storage part 33 along the installing direction X, the container side joint 51 and the main body side joint 53 are coupled to each other along the coupling direction along the installing direction X of the cleaning liquid tank 31.

First, the container side joint 51 will be described with reference to FIG. 3. The container side joint 51 includes a cap 61 attached to the cylindrical mouth 45 of the cleaning liquid tank 31, and a container opening/closing valve 63 and a backflow prevention valve 65 which are stored in the cap 61. In the following description, a side of the inside of the cleaning liquid tank 31 in the coupling direction is defined as the inside, and a side of the outside of the cleaning liquid tank 31 in the coupling direction is defined as the outside.

The cap 61 has a main body part 71 and a sub-body part 73 assembled to the main body part 71. The main body part 71 has a large-diameter cylindrical portion 71*a* and a small-diameter cylindrical portion 71*b* which are formed coaxially, and an annular end wall portion 71*c* between the cylindrical portions 71*a* and 71*b*. Around the inner circumferential surface of the large-diameter cylindrical portion 71*a*, a screw to be meshed with the screw of the cylindrical mouth 45 of the cleaning liquid tank 31 is formed. Around the outer end portion of the inner circumferential surface of the small-diameter cylindrical portion 71*b*, an annular protrusion 75 is formed along the circumferential direction. The inner end surface of the protrusion 75 is tapered toward the outer end. Around the outer end portion of the outer circumferential surface of the small-diameter cylindrical portion 71*b*, an annular recess 77 is formed along the circumferential direction. In the recess 77, an O-ring 79 is housed.

On the inner surface of the end wall portion 71*c*, an inner cylindrical portion 81 is formed. The inner cylindrical portion 81 is disposed outside the small-diameter cylindrical portion 71*b* in the radial direction and coaxially with the large-diameter cylindrical portion 71*a* and the small-diameter cylindrical portion 71*b*. Around the inner circumferential surface of the inner cylinder portion 81, a screw is formed.

The sub-body part 73 has a large-diameter cylindrical portion 73*a* and a small-diameter cylindrical portion 73*b* which are formed coaxially, and an annular end wall portion 73*c* between the cylindrical portions 73*a* and 73*b*. Around the inner circumferential surface of the large-diameter cylindrical portion 73*a*, a step portion 85 protruding radially is formed along the circumferential direction. Around the outer circumferential surface of the large-diameter cylindrical portion 73*a*, a screw is formed to be meshed with the screw of the inner cylindrical portion 81 of the main body part 71. By meshing the screw of the large-diameter cylindrical portion 73*a* of the sub-body part 73 with the screw of the inner cylindrical portion 81 of the main body part 71, the sub-body part 73 is assembled to the main body part 71.

In the large-diameter cylindrical portion 73*a*, an inner cylindrical body 87 is housed. A lattice-like stopper 89 is formed in the outer opening of the inner cylindrical body 87. Around the outer end portion of the outer circumferential surface of the inner cylindrical body 87, an annular portion 91 protruding radially is formed. The annular portion 91 comes into contact with the step portion 85 of the large-diameter cylindrical portion 73*a*.

The cap 61 is attached to the cleaning liquid tank 31 by meshing the screw of the large-diameter cylindrical portion 71*a* of the main body part 71 with the screw of the cylindrical mouth 45 of the cleaning liquid tank 31. When the cap 61 is attached to the cylindrical mouth 45 in this manner, the inside of the small-diameter cylinder portion 71*b* of the main body part 71 of the cap 61 and the inside of the sub-body part 73 (the inside of the inner cylindrical body 87) are communicated with the inside of the cleaning liquid tank 31 to form a container side communication passage 95. The cleaning liquid in the cleaning liquid tank 31 is supplied to the main body side joint 53 through the container side communication passage 95 along the supply direction Y from the inflow port 95*a* (the opening of the small-diameter cylindrical portion 73*b* of the sub-body part 73) to the outflow port 95*b* (the opening of the small-diameter cylindrical portion 71*b* of the main body part 71). The supply direction Y is along the coupling direction (the installing direction X) of both joints 51 and 53. An axis passing through the center of the container side communication passage 95 along the coupling direction is defined as a center axis O.

Further, on the inner surface of the end wall portion 71*c* of the main body part 71, a cylindrical inner seal portion 97 and a cylindrical outer seal portion 99 are formed. The inner seal portion 97 comes into tightly contact with the inner circumferential surface of the large-diameter cylindrical portion 73*a* of the sub-body part 73, and seals a space between the main body part 71 and the sub-body part 73. The outer seal portion 99 comes into tightly contact with the inner circumferential surface of the cylindrical mouth 45 of the cleaning liquid tank 31, and seals a space between the cylindrical mouth 45 and the cap 61.

Next, the container opening/closing valve 63 will be described with reference to FIG. 5. The container opening/closing valve 63 is formed in a substantially cylindrical shape having a length slightly longer than the length of the small-diameter cylindrical portion 71*b* of the main body part 71 of the cap 61, and an outer diameter smaller than the inner diameter of the protrusion 75 of the small-diameter cylindrical portion 71*b*. Around one end portion of the container opening/closing valve 63, a large-diameter portion 63*a* is formed. Around the outer circumferential surface of the large-diameter portion 63*a*, an annular recess 101 is formed along the circumferential direction. In the recess 101, an O-ring 103 (see FIG. 3) is housed. A part of the tip end surface 105 of the large-diameter portion 63*a* is inclined with respect to the center axis O. As an example, the inclination angle of the tip end surface 105 with respect to the center axis O is 45 degrees. The O-ring 103 is an example of an elastic body in the present disclosure.

As shown in FIG. 3, the container opening/closing valve 63 is housed in the small-diameter cylindrical portion 71*b* of the main body part 71 of the cap 61 with the large-diameter portion 63*a* facing outside. Between the large-diameter portion 63*a* and the inner cylindrical body 87 housed in the sub-body part 73 of the cap 61, a first valve biasing spring 107 is disposed. The container opening/closing valve 63 is biased toward the outflow port 95*b* by the first valve biasing spring 107, and the O-ring 103 comes into contact with the inner end surface of the protrusion 75. Thereby, the outflow port 95*b* is closed by the container opening/closing valve 63. The tip end portion of the container opening/closing valve 63 slightly protrudes from the outflow port 95*b*.

Next, the backflow prevention valve 65 will be described with reference to FIG. 3. The backflow prevention valve 65 is a spherical member having a diameter smaller than the inner diameter of the inner cylindrical body 87 of the cap 61. The backflow prevention valve 65 is housed in the inner cylindrical body 87. Between the stopper 89 of the inner cylindrical body 87 and the backflow prevention valve 65, a second valve biasing spring 111 is disposed. The backflow prevention valve 65 is biased toward the inflow port 95*a* by the second valve biasing spring 111, and is brought into contact with the end wall portion 73*c* of the sub-body part 73 via an O-ring 113. Thereby, the inflow port 95*a* is closed by the backflow prevention valve 65.

In a state where the cap 61 is attached to the cylindrical mouth 45, the container side communication passage 95 is filled with the cleaning liquid. Specifically, the cleaning liquid is filled between the container opening/closing valve 63 and the backflow prevention valve 65. The container opening/closing valve 63 is also biased toward the outflow port 95*b* by the liquid pressure of the filled liquid, and the O-ring 103 is pressed against the protrusion 75.

Next, the main body side joint 53 will be described with reference to FIG. 4. The main body side joint 53 includes an outer cylinder 201 fixed on the inner wall 33*b* of the storage part 33, an inner cylinder 203 housed in the outer cylinder 201, a main body opening/closing valve 205 housed in the inner cylinder 203, and a connection cylinder 207 attached to the inner cylinder 203 and connected to the container side joint 51. In the following description, a side of the inside of the storage part 33 in a direction opposite to the coupling direction is defined as the inside, and a side of the outside of the storage part 33 in the direction opposite to the coupling direction is defined as the outside.

The outer cylinder 201 is a cylindrical member, is disposed coaxially with the center axis O of the container side joint 51 of the cleaning liquid tank 31 installed in the storage part 33 (the center axis O of the container side communication passage 95), and is fixedly fitted in an attachment port 33*c* formed in the inner wall 33*b* of the storage part 33.

The inner cylinder 203 has an outer diameter capable of being housed in the outer cylinder 201 and a length longer than the outer cylinder 201. Around the inner circumferential surface of the inner cylinder 203, an annular step portion 203*a* is formed along the circumferential direction. Around the outer circumferential surface of one end portion of the inner cylinder 203, an annular recess 221 is formed along the circumferential direction. In the recess 221, an O-ring 223 is housed. Around the outer circumferential surface of the one end portion of the inner cylinder 203, a flange portion 225 protruding radially is formed along the circumferential direction.

The inner cylinder 203 is housed and fixed in the inner space of the outer cylinder 201 with the one end portion on which the recess 221 is formed facing outside. The outer end portion of the inner cylinder 203 protrudes from the outer opening of the outer cylinder 201. The tube 47 is connected to the inner end portion of the inner cylinder 203.

The inner space of the inner cylinder 203 forms a main body side communication passage 229. Through the main body side communication passage 229, the cleaning liquid supplied from the cleaning liquid tank 31 is supplied to the tube 47 along the supply direction Y from the inflow port 229*a* (the outer opening of the inner cylinder 203) to the outflow port 229*b* (the inner opening of the inner cylinder 203). The center axis of the main body side communication passage 229 coincides with the center axis O of the container side communication passage 95.

Next, the main body opening/closing valve 205 will be described with reference to FIG. 5. The main body opening/closing valve 205 is a substantially cylindrical member, and has an outer diameter capable of being housed in the inner space of the inner cylinder 203 (the main body side communication passage 229). On one end surface of the main body opening/closing valve 205, a protruding part 231 having a semicircular cross-sectional shape protrudes. The tip end surface 233 of the protruding part 231 is inclined with respect to the center axis O. As an example, the inclination angle of the tip end surface 233 with respect to the center axis O is 45 degrees.

On the outer circumferential surface of the main body opening/closing valve 205, two flange portions 235 are formed via a predetermined interval in the axial direction. Further, on the outer circumferential surface of the main body opening/closing valve 205, an annular recess 237 is formed along the circumferential direction between the two flange portions 235 and the protruding part 231. An O-ring 239 is housed in the recess 237.

The main body opening/closing valve 205 is housed in the inner cylinder 203 with the protruding part 231 facing outside. Between the flange portions 235 of the main body opening/closing valve 205 and the annular step portion 203*a* of the inner cylinder 203, a third valve biasing spring 241 is disposed. A spring constant of the third valve biasing spring 241 is smaller than that of the first valve biasing spring 107 (see FIG. 3) of the container side joint 51. The third valve biasing spring 241 biases the main body opening/closing valve 205 toward the inflow port 229*a*, and the protruding part 231 of the main body opening/closing valve 205 protrudes from the inflow port 229*a*. Even when the third valve biasing spring 241 is most compressed, the protruding part 231 of the main body opening/closing valve 205 protrudes from the inflow port 229*a*.

The connection cylinder 207 is a cylindrical member, and has a cylindrical fitting portion 251 and a guide portion 253, and a partition wall 255 provided between the fitting portion 251 and the guide portion 253. The cylindrical fitting portion 251 is fitted onto the outer end portion of the inner cylinder 203. At this time, the space between the connection cylinder 207 and the inner cylinder 203 is sealed by the O-ring 223 housed in the recess 221 of the inner cylinder 203.

The guide portion 253 has an inner diameter capable of fitting onto the small-diameter cylindrical portion 71*b* of the main body part 71 of the cap 61 of the container side joint 51. An opening 257 is formed in the center of the partition wall 255. The opening 257 has a diameter smaller than the diameter of the inflow port 229*a* of the inner cylinder 203. The protruding part 231 of the main body opening/closing valve 205 protrudes into the guide portion 253 through the opening 257.

Figure 6:
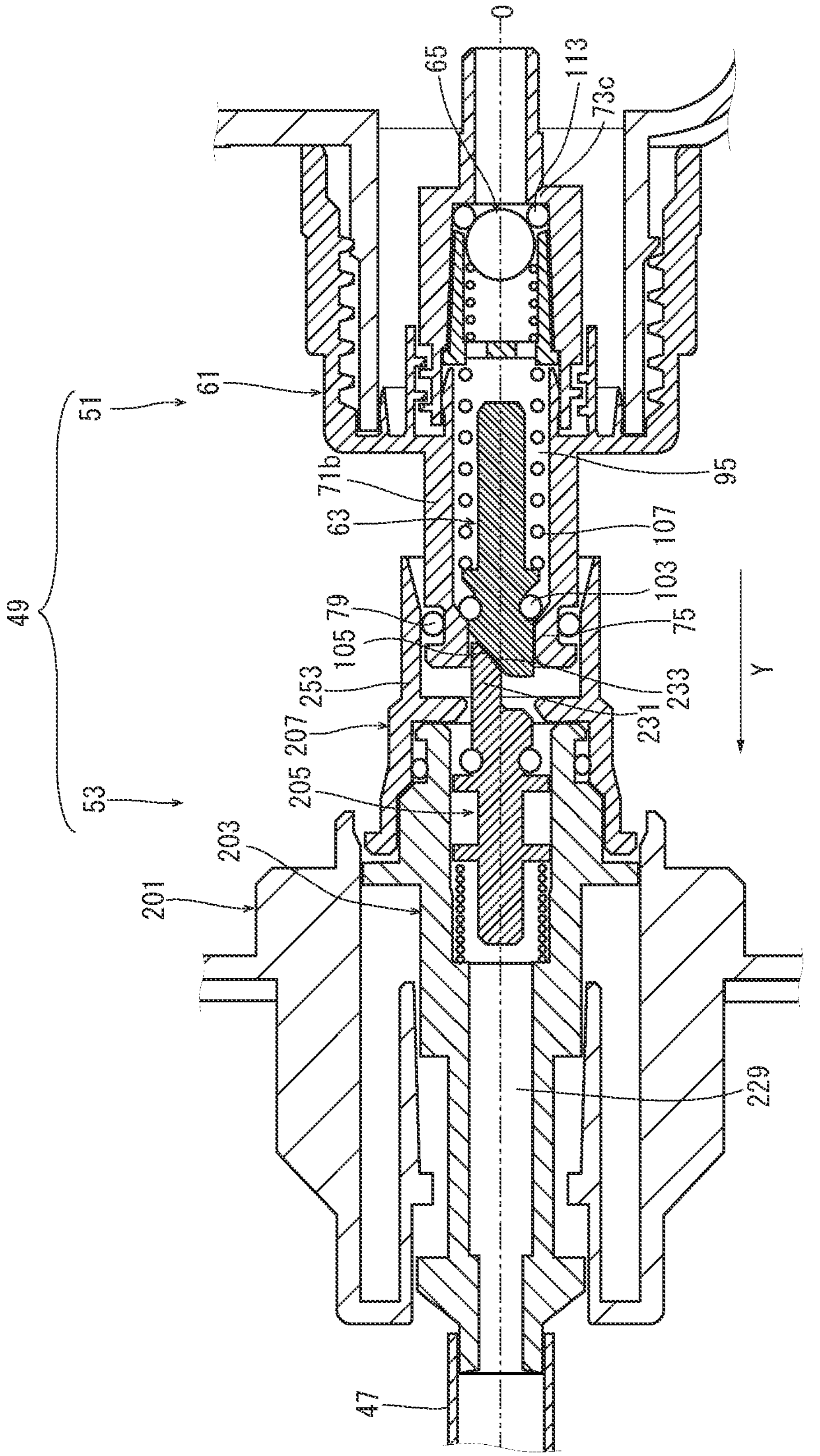
FIG. 6 is a sectional view showing the coupling structure according to the embodiment of the present disclosure, at a coupling process between the container side joint and the main body side joint (in a state where the container opening valve and the main body opening valve are contact with each other).
Figure 7:
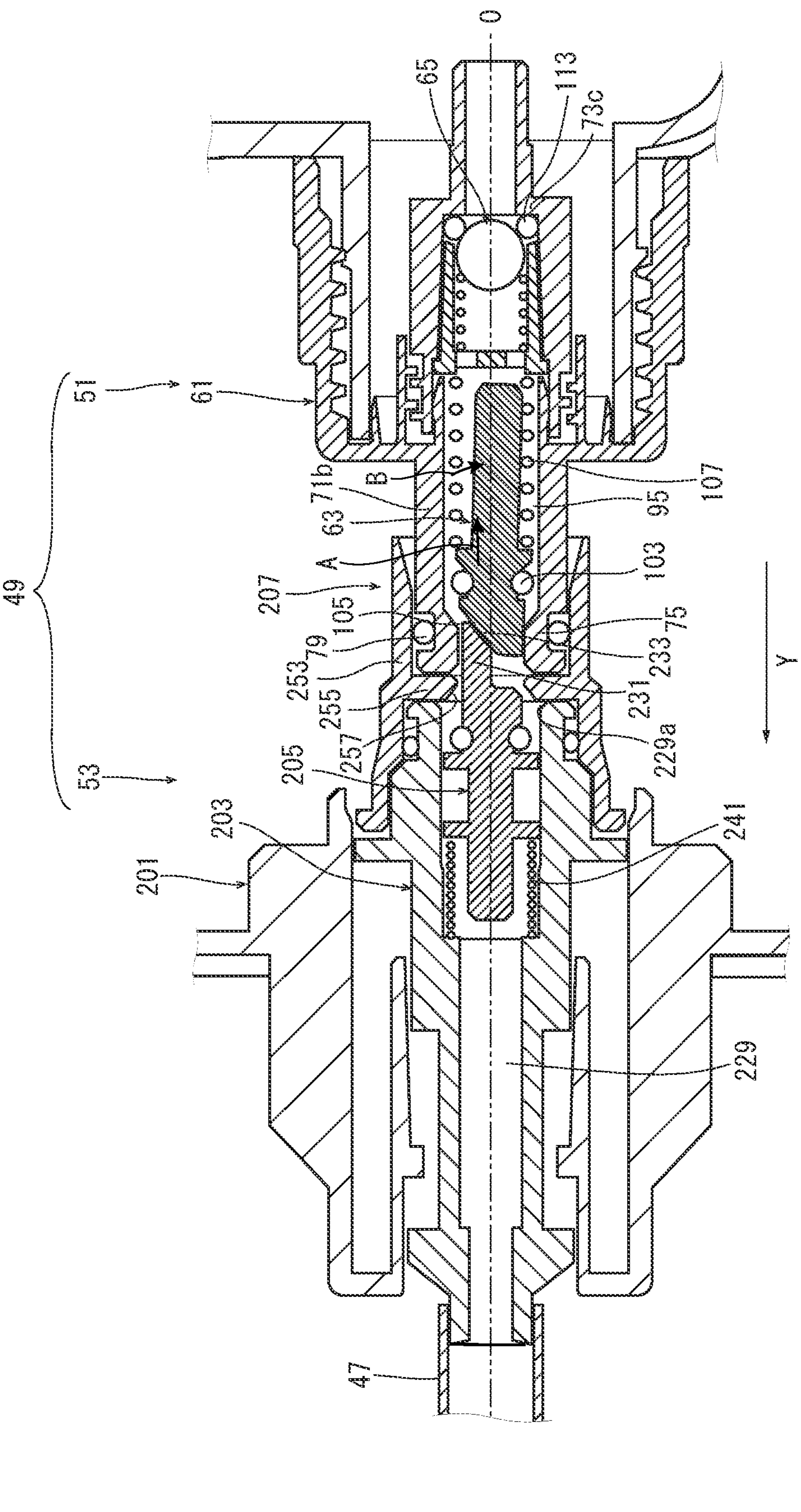
FIG. 7 is a sectional view showing the coupling structure according to the embodiment of the present disclosure, at the coupling process between the container side joint and the main body side joint (in a state where the container opening valve is pushed in by the main body opening valve).
Figure 8:
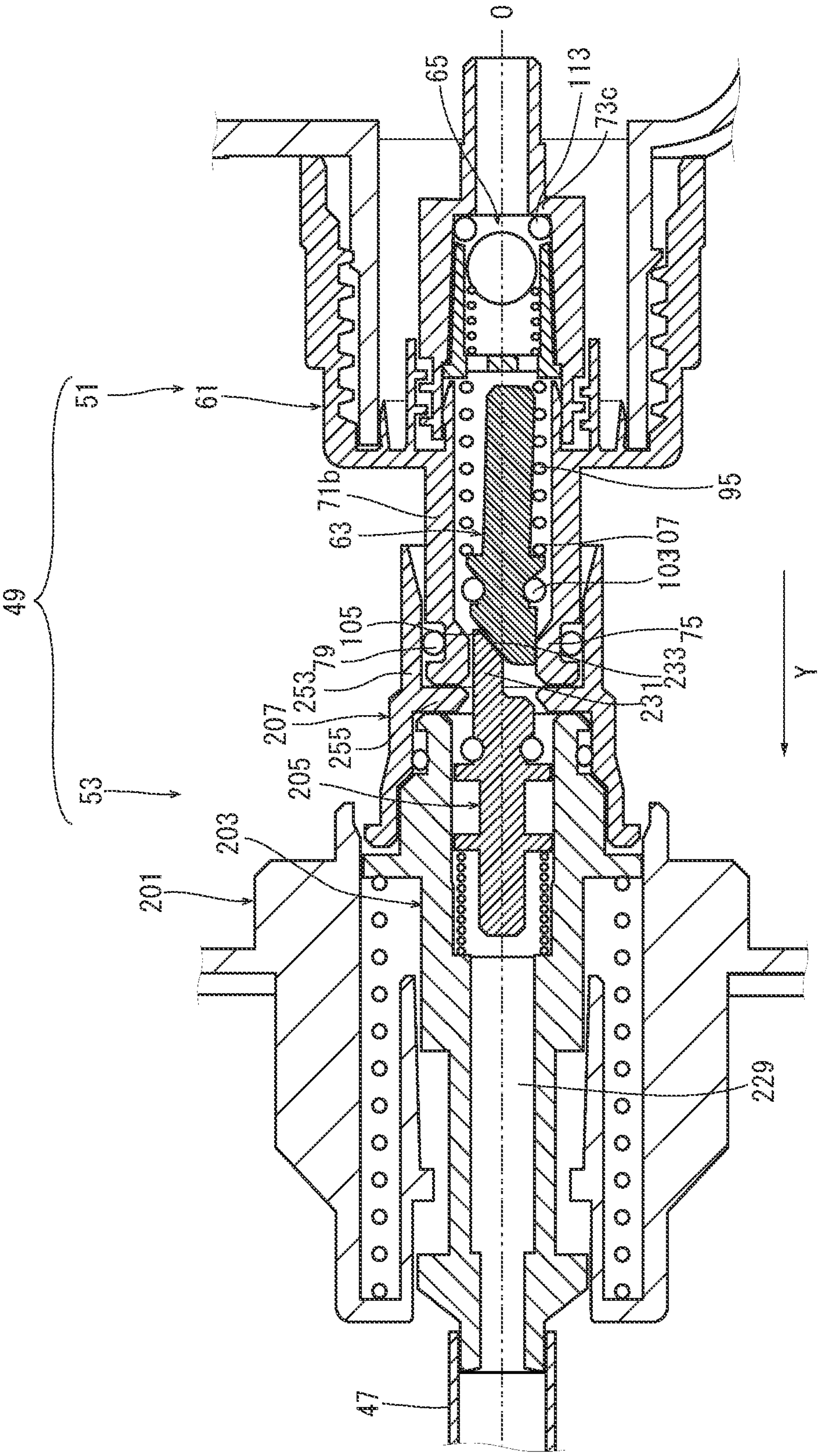
FIG. 8 is a sectional view showing the coupling structure according to the embodiment of the present disclosure, at the coupling process between the container side joint and the main body side joint (in a state where a backflow prevention valve is opened).

The coupling between the container side joint 51 and the main body side joint 53 in the above-described coupling structure 49 will be described with reference to FIG. 3 to FIG. 5 and FIG. 6 to FIG. 8. FIGS. 6 to 8 are sectional views showing the coupling structure 49.

As described with reference to FIG. 3, the container side communication passage 95 of the container side joint 51 is filled with the cleaning liquid. The container opening/closing valve 63 closes the outflow port 95*b* in such a way that the O-ring 103 comes into contact with the inner end surface of the protrusion 75 by the biasing force of the first valve biasing spring 107 and the liquid pressure of the filled cleaning liquid. The backflow prevention valve 65 is biased by the second valve biasing spring 111 and comes into contact against the end wall portion 73*c* via the O-ring 113 to close the inflow port 95*a*.

First, as shown in FIG. 6, the small-diameter cylindrical portion 71*b* of the cap 61 of the container side joint 51 is inserted into the guide portion 253 of the connection cylinder 207 of the main body side joint 53. At this time, the container opening/closing valve 63 and the main body opening/closing valve 205 are aligned such that the tip end surface 105 of the container opening/closing valve 63 and the tip end surface 233 of the protruding part 231 of the main body opening/closing valve 205 face each other. When the small-diameter cylindrical portion 71*b* is pushed along the guide portion 253, the tip end surface 105 of the container opening/closing valve 63 comes into contact with the tip end surface 233 of the protruding part 231 of the main body opening/closing valve 205. Further, the O-ring 79 of the small-diameter cylindrical portion 71*b* of the cap 61 seals the space between the small-diameter cylindrical portion 71*b* and the guide portion 253 in a liquid-tight manner.

When the cap 61 is further pushed in, as shown in FIG. 7, the container opening/closing valve 63 is pushed in along the center axis O (the coupling direction) by the main body opening/closing valve 205 against the biasing force of the first valve biasing spring 107. That is, since the spring constant of the third valve biasing spring 241 biasing the main body opening/closing valve 205 is larger than the spring constant of the first valve biasing spring 107 biasing the container opening/closing valve 63, the container opening/closing valve 63 is pushed in preferentially.

As described above, the tip end surface 233 of the protruding part 231 of the main body opening/closing valve 205 and the tip end surface 105 of the container opening/closing valve 63 are inclined with respect to the center axis O. Further, the protruding part 231 has the semicircular cross-sectional shape. Thus, the tip end surface 233 of the protruding part 231 comes into contact with the substantially half portion of the tip end surface 105 of the container opening/closing valve 63. Therefore, when the main body opening/closing valve 205 pushes the container opening/closing valve 63, the container opening/closing valve 63 is applied with a force (see the arrow A in FIG. 7) parallel to the center axis O, which is deviated from the center axis O, and a force (see the arrow B in FIG. 7) in a direction crossing the center axis O, and the container opening/closing valve 63 is pushed along the central axis O and tilted with respect to the center axis O. More specifically, the container opening/closing valve 63 is tilted to the side opposite to the contact surface between the tip end surfaces 233 and 105. Then, the O-ring 103 is separated from the protrusion 75, and a gap is opened between the container opening/closing valve 63 and the protrusion 75.

As a result, the container side communication passage 95 of the container side joint 51 communicates with the main body side communication passage 229 of the main body side joint 53. Then, the cleaning liquid filled in the container side communication passage 95 of the cap 61 flows into the main body side communication passage 229 from the outflow port 95*b* through the opening 257 of the partition wall 255 of the connection cylinder 207 and the inflow port 229*a* of the inner cylinder 203. The cap 61 can be pushed in until the small-diameter cylindrical portion 71*b* comes into contact with the partition wall 255 of the connection cylinder 207.

Thereafter, when the pump connected to the tube 47 is driven, the main body side communication passage 229 and the container side communication passage 95 become negative pressure, and the cleaning liquid flowing into the main body side communication passage 229 is drawn in the tube 47. Further, as shown in FIG. 8, the backflow prevention valve 65 of the container side joint 51 is separated from the O-ring 113, and the inflow port 95*a* of the container side communication passage 95 is opened. As a result, the cleaning liquid in the cleaning liquid tank 31 is drawn into the tube 47 through the communication passages 95 and 229, and supplied to the cleaning unit 27 (see FIG. 1).

As described above, according to the coupling structure 49 of the present disclosure, when the container side joint 51 and the main body side joint 53 are coupled to each other, the inclined tip end surface 105 of the container opening/closing valve 63 and the inclined tip end surface 233 of the main body opening/closing valve 205 are brought into contact with each other. Further, the container opening/closing valve 63 and the main body opening/closing valve 205 are brought into contact with each other at a position deviated from the center axis O.

Therefore, the container opening/closing valve 63 is pushed in by receiving a force along the center axis O (the coupling direction) from the main body opening/closing valve 205 and is also tilted by receiving a force along the direction crossing the center axis O to open the outflow port 95*b* of the container side communication passage 95. Accordingly, the distance necessary for pushing the container opening/closing valve 63 along the center axis O in order to communicate the communication passages 95 and 229 can be shortened. That is, the distance for moving the container opening/closing valve 63 against the biasing force of the first valve biasing spring 107 and the liquid pressure of the cleaning liquid filled in the container side communication passage 95 can be reduced. Therefore, the container side joint 51 and the main body side joint 53 can be coupled to each other with a small force, so that the coupling work of both joints can be made easy.

Further, since the container opening/closing valve 63 and the main body opening/closing valve 205 are in contact with each other at the inclined tip end surfaces 105 and 233, the container opening/closing valve 63 can be stably pushed in by the main body opening/closing valve 205. However, the tip end surface 233 of the protruding part 231 of the main body opening/closing valve 205 and the tip end surface 105 of the container opening/closing valve 63 may be formed in a flat surface (a surface orthogonal to the center axis O) instead of the inclined surface. Alternatively, the entire tip surfaces of both the container opening/closing valve 63 and the main body opening/closing valve 205 may be formed to be inclined surfaces in contact with each other.

The coupling structure 49 of the present invention can also be applied to the coupling between the ink container and the recording head.

While the present disclosure has been described for specific embodiments, the present disclosure is not limited to the above embodiments. Those skilled in the art may modify the embodiments described above without departing from the scope and spirit of the present disclosure.

The invention claimed is:

1. A coupling structure which couples a container in which a liquid is contained and a body to be supplied with the liquid from the container, the coupling structure comprising:

- a container side joint attached to a supply port of the container; and
- a main body side joint attached to an inflow port of the body, and the container side joint includes:

- a container opening/closing valve capable of opening and closing the supply port;
- a container side communication passage communicated with the supply port and an inside of the container;
- a backflow prevention valve which prevents a backflow of the liquid from the container side communication passage to the inside of the container; and
- a protrusion with which the container opening/closing valve is brought into contact by a pressure of the liquid filled in the container side communication passage between the container opening/closing valve and the backflow prevention valve, the main body side joint includes:

a main body opening/closing valve capable of opening and closing the inflow port; and a main body side communication passage communicated with the inflow port, and when the main body opening/closing valve pushes the container opening/closing valve at a coupling of the container side joint and the main body side joint, the container opening/closing valve is pushed in a coupling direction, is also tilted and is separated from the protrusion to communicate the container side communication passage with the main body side communication passage.

2. The coupling structure according to claim 1, wherein the main body opening/closing valve has a tip end surface inclined with respect to the coupling direction, and the container opening/closing valve has a tip end surface inclined with respect to the coupling direction and coming into contact with the tip end surface of the main body opening/closing valve.

3. The coupling structure according to claim 2, wherein the main body opening/closing valve has a protruding part having a semicircular cross section and protruding into the supply port, and the tip end surface is formed in the protruding part.

4. The coupling structure according to claim 1, wherein the main body opening/closing valve and the container opening/closing valve are in contact with each other at a position deviated from a center axis of the container side communication passage and the main body side communication passage.

5. The coupling structure according to claim 4, wherein the container opening/closing valve is tilted to a side opposite to a contact surface between the tip end surfaces with respect to the center axis.

6. The coupling structure according to claim 1, wherein the container opening/closing valve is pressed on the protrusion via an elastic body.

7. An image forming apparatus comprising a cleaning liquid tank and a cleaning unit which are coupled to each other using the coupling structure according to claim 1.

* * * * *